United States Patent
Shah

(10) Patent No.: US 6,618,167 B1
(45) Date of Patent: Sep. 9, 2003

(54) APPARATUS AND METHOD FOR DOCUMENT SCHEDULING IN ORDER TO IMPROVE THE PRODUCTIVITY OF A NETWORKED PRINTER

(75) Inventor: Dinesh S. Shah, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/466,979

(22) Filed: Dec. 17, 1999

(51) Int. Cl.[7] .............................................. G06F 15/00
(52) U.S. Cl. ...................................... 358/1.15; 358/1.13
(58) Field of Search .............................. 358/1.15, 1.12, 358/1.1, 1.13, 1.14, 1.16, 1.17, 523, 406, 426.01, 426.02, 426.06; 710/16, 39, 45, 58, 60, 64

(56) References Cited

U.S. PATENT DOCUMENTS

| | | | |
|---|---|---|---|
| 5,095,369 A | 3/1992 | Ortiz et al. | |
| 5,129,049 A | 7/1992 | Cuzzo et al. | |
| 5,287,194 A | 2/1994 | Lobiondo | |
| 5,696,893 A | 12/1997 | Fromberz et al. | |
| 5,699,493 A | * 12/1997 | Davidson et al. | 358/1.15 |

FOREIGN PATENT DOCUMENTS

JP 2001209508 A * 8/2001 ............. G06F/3/12

* cited by examiner

Primary Examiner—Arthur G. Evans
(74) Attorney, Agent, or Firm—Oliff & Berridge, PLC

(57) ABSTRACT

This invention provides a scheduling scheme that uses an estimated rasterization execution time (RET) to improve the productivity of printers, particularly color printers. Because print jobs have different levels of complexities, a longer RET may be require for some jobs than for others. For example, a print job which includes color graphics, color print, different font changes or a variety of style formats such as, italic, bold and other styles, will have a longer RET than a simple black and white print job. If a print job is pre-scanned to estimate the RET before the print job arrives at the printer, it is possible to schedule those print jobs with a shorter RET ahead of those print jobs with a longer RET, thus improving productivity of the printer.

24 Claims, 3 Drawing Sheets

FIG. 2
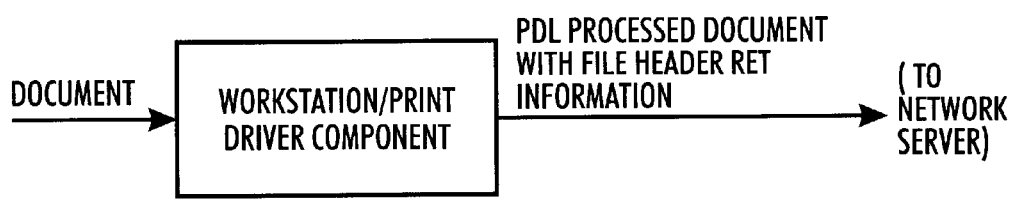
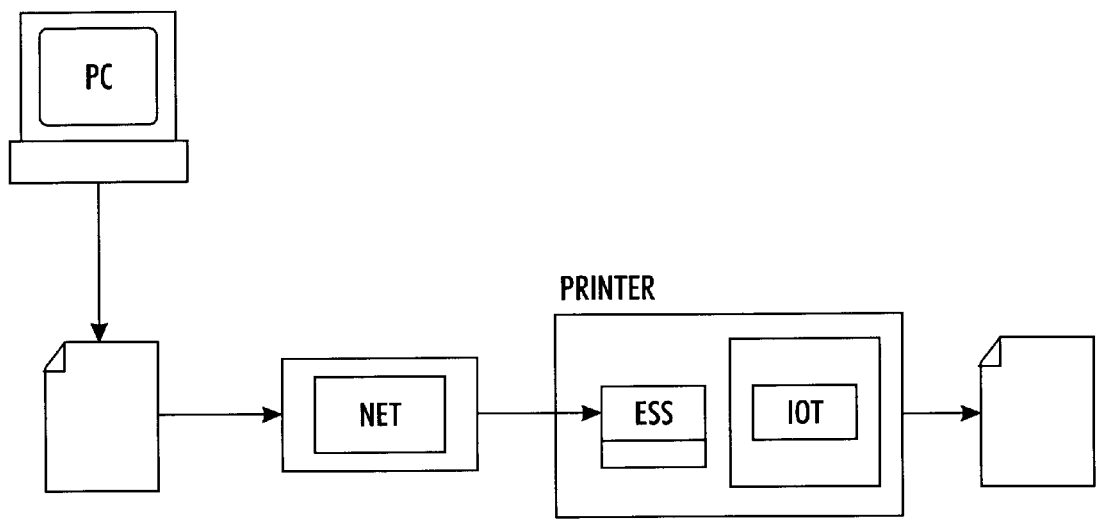
FIG. 3

APPARATUS AND METHOD FOR DOCUMENT SCHEDULING IN ORDER TO IMPROVE THE PRODUCTIVITY OF A NETWORKED PRINTER

BACKGROUND OF THE INVENTION

1. Field of Invention

The present invention relates generally to a document scheduling scheme for improving the productivity of a networked printer.

2. Description of Related Art

Traditionally, a printer prints a job as the job arrives to the printer. In a networked printer environment, a network server presents the jobs queued at the network to the printer for printing sequentially. The printer is traditionally a two-phase work center. In the first phase of the printing function, the printer processes in the job for rasterization. The process is known as raster image processing (RIP). In the second phase of the printing function, the printer prints the job. If there are some jobs that have complex color graphics, the electronic subsystem (ESS) in the printer takes a long time to rasterize the image. In this situation, the first phase printer RIP function for a complex job results in an image output terminal (IOT) in the printer staying idle. Thus, for example, a simple black and white printing job may have to wait a long period while the complex job is ripped and eventually printed. Therefore, the printers productivity is not fully utilized.

SUMMARY OF THE INVENTION

This invention provides a scheduling scheme that uses an estimated rasterization execution time (RET) to improve the productivity of printers, and particularly color printers. A networked color printer gets a variety of jobs, which simplistically can be classified into two categories, e.g., simple and complex. Because print jobs have different levels of complexities, a longer RET may be required for some jobs, e.g., complex jobs, than for others, e.g., simple jobs. For example, a complex print job which includes color graphics, color print, different font changes or a variety of style formats such as, italic, bold and other styles, will have a longer RET than a simple black and white print job. If a print job is pre-scanned to estimate the RET before the print job arrives at the printer, it is possible to schedule those print jobs with a shorter RET ahead of those print jobs with a longer RET, thus improving productivity of the printer. This allows the use of one set of color printers capable of efficiently doing both color and black and white jobs, instead of using separate color and black and white printers.

A printer can be viewed as two work centers in series, an ESS work center and an IOT work center. The ESS work center of a printer takes a file and RIPs it. When a file is ripped, all of the information in the document file is converted into a bitmap. Then, the ESS work center of the printer sends the document file to the printer's second work center, the IOT. The IOT prints the file. However, the IOT cannot print the file until after the RIP function has been performed. To get the highest efficiency from the series combination of the ESS and the IOT, the functions of both the ESS and the IOT must be balanced.

Since the majority of print jobs fall into the simple category, users are frustrated with waiting for complex jobs to finish which were submitted ahead of their jobs. Therefore, to balance the functions between the ESS and the IOT, the present invention uses a two queue approach. For example, the print jobs which require a minimum amount of time for the ESS to process, i.e., the simple jobs, are placed in one queue, e.g., a simple queue, and the print jobs which are more complex and time consuming for the ESS are placed in a second queue, e.g., a complex queue. The print jobs which are in the simple queue are ripped and printed first, even if these print jobs arrive after the complex jobs, and then the print jobs in the complex queue are processed. This reduces the IOT idle time which significantly improves the wait time for simple print jobs.

A print driver, preferably located in the workstation, pre-scans a document and takes the document file and converts it into a postscript (page description language, PDL) print ready file. Additionally, the print driver attaches a header to the file. The header will identify the complexity level of the document file, including whether the file is color or black and white, e.g., simple or complex. The printer, or print server, will read the header information and, based on the header information, schedules the print jobs by placing the document file into an appropriate queue, e.g., a simple queue or a complex queue. Print jobs in the simple queue will have a higher priority than print jobs in the complex queue.

The two queue approach is for simplicity purposes. Alternatively, a single queue can be used in which the jobs are arranged in ascending order of their RET estimates. The jobs with the smallest RET estimates will be ripped and printed first.

A priority override structure may also be included in this invention. For example, a customer will be allowed to assign a priority level to a specific print job regardless of whether the job is allocated to the simple queue or the complex queue. Authorized customers with access authorization will be able to advance the priority of specific print jobs. Thus, the printer will take this priority override information and process it accordingly. Therefore, jobs with the highest priority will print first, regardless of the complexity level. However, priority override capabilities should be limited to a few individuals to maintain the overall efficiency of the system.

This invention provides systems and methods for reducing wait time for simple print jobs by scheduling a document based on rasterization execution time estimate.

This invention separately provides systems and methods for assigning a complexity rating to print jobs.

This invention separately provides systems and methods for pre-scanning document files via a workstation print driver.

These and other features and advantages of this invention are described in or are apparent from the following detailed description of this invention.

BRIEF DESCRIPTION OF THE DRAWINGS

Various exemplary embodiments of this invention will be described in detail, with reference to the following figures, wherein:

FIG. 2 illustrates an exemplary workstation with a print driver component in accordance with the systems and methods of the invention;

FIG. 3 illustrates a second exemplary document RET scheduling device in accordance with the systems and methods of the invention.

DETAILED DESCRIPTION OF PREFERRED EMBODIMENTS

Figure 1:
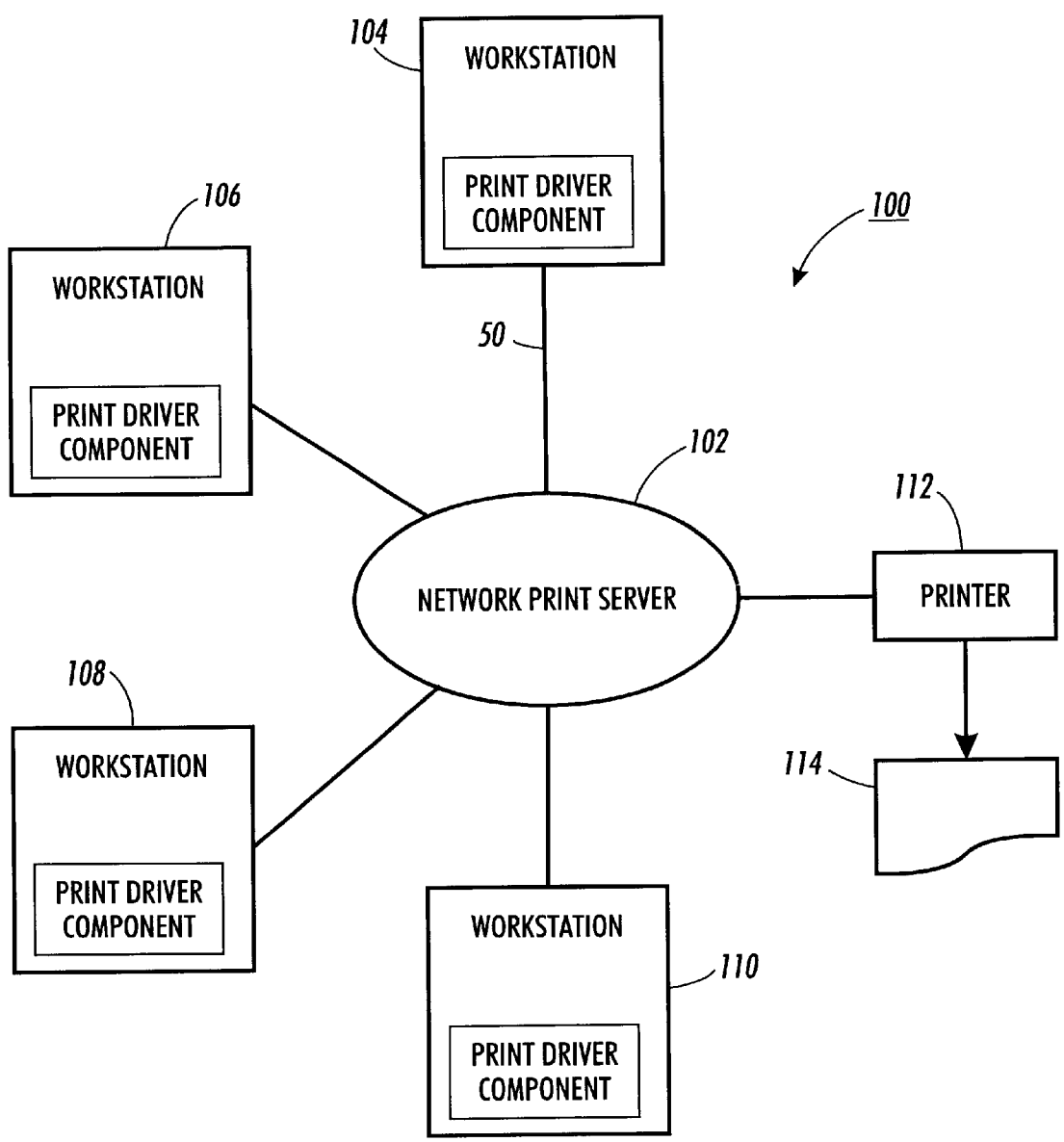
FIG. 1 illustrates a first exemplary document RET scheduling device in accordance with the systems and methods of the invention.

For a general understanding of the features of the present invention, reference is made to the drawings, wherein like reference numerals have been used throughout to identify identical or similar elements. While the present invention will be described in terms of an illustrative embodiment or embodiments, it will be understood that the invention is adaptable to a variety of printing applications, such that the present invention is not necessarily limited to the particular embodiment or embodiments shown and described herein. To the contrary, the following description is intended to cover all alternatives, modifications, and equivalents, as may be included within the spirit and scope of the invention. Specifically, it will be understood that the instant invention applies to various types of networked printing systems and is not intended to be limited by the manner in which the different scheduling schemes are described.

FIG. 1 illustrates an exemplary document rasterization execution time (RET) scheduling device 100 in accordance with a first embodiment of the systems and methods of the invention. In this first exemplary embodiment, the document RET scheduling device 100 is incorporated into or can be a part of a networked printing system. The document RET scheduling device 100 includes workstations 104, 106, 108, 110, a networked print server 102 and a printer 112 capable a printing onto a print medium 114, all interconnected by links 50. The links 50 can be a wired or wireless link or any known or later developed elements that is capable of supplying electronic data to and from the connected element.

Each of the workstations 104, 106, 108, 110 are associated with a print driver component. The print driver component pre-scans a document file and assigns a complexity rating to the document file. The complexity rating takes into consideration the type of document, e.g., color or black and white, whether color graphics are present, the different kinds of fonts and print styles, or the like. The complexity rating is then encoded into a file header. The document file, along with the file header is sent to the networked print server 102.

The networked print server stores and spools the document file, including the file header. The printer 112 can look at the job complexity rating coded in the file header and based on the complexity rating, place the document in one of two queues, a simple queue and a complex queue. Once the document file is stored in either the simple or complex queue, the printer can prioritize all jobs in both queues based on this rating. The jobs in the simple queue will normally be printed first. Alternatively, the networked print server 102 can prioritize all jobs based on the complexity rating and send the job with the highest priority to the printer 112 first. The printer 112 will then print the job onto a print medium 114, e.g., paper.

While the print driver component is shown separately from the networked print server 102 and printer 112 it is appreciated that the print driver component could be incorporated into the particular networked print server 102 or printer 112. In general, FIG. 1 represents an embodiment in which the document RET scheduling device is incorporated or otherwise connected to a networked printer environment. However, in general, the document RET scheduling device 100 can be located anywhere.

FIG. 2 illustrates an exemplary workstation 104 with a print driver component in accordance with the systems and methods of the invention. The workstation 104 receives a document file from a user. The print driver component in the workstation 104 pre-scans the document and assigns the document file a complexity rating. This complexity rating corresponds to a rasterization execution time (RET) for the document. The print driver component places this RET information into a file header and sends it to the networked server 102 along with the document file. Thus, the complexity level of the document file is determined before the document file is sent to the networked server 102 and eventually to the printer 112.

FIG. 3 illustrates an exemplary document RET scheduling device 100 in accordance with a second embodiment of the systems and methods of the invention. In this second exemplary embodiment, a personal computer, which includes a print driver component, converts a document file into a postscript print ready file. This postscript print ready file includes a header which provides a complexity rating of the document. The postscript print ready file is then sent to the networked print server.

The networked print server stores and spools the document file. The network print server may include a job scheduler component or the job scheduler component can be included in the printer. The job scheduler component is capable of scheduling the print jobs based on the document RET and/or based on a custom scheduling scheme. The custom scheduling scheme may include a priority override feature which allows the user to set a print priority regardless of the RET.

Additionally, the networked print server may be attached to several printers. The network print server assigns the print job to the appropriate printer selected by the personal computer. The assigned printer's electronic subsystem (ESS) looks at the header information and document and converts the document into a bitmap. Once the document is converted into a bitmap, the document is sent to the printer's image output terminal (IOT) and the printer starts printing the job.

Figure 4:
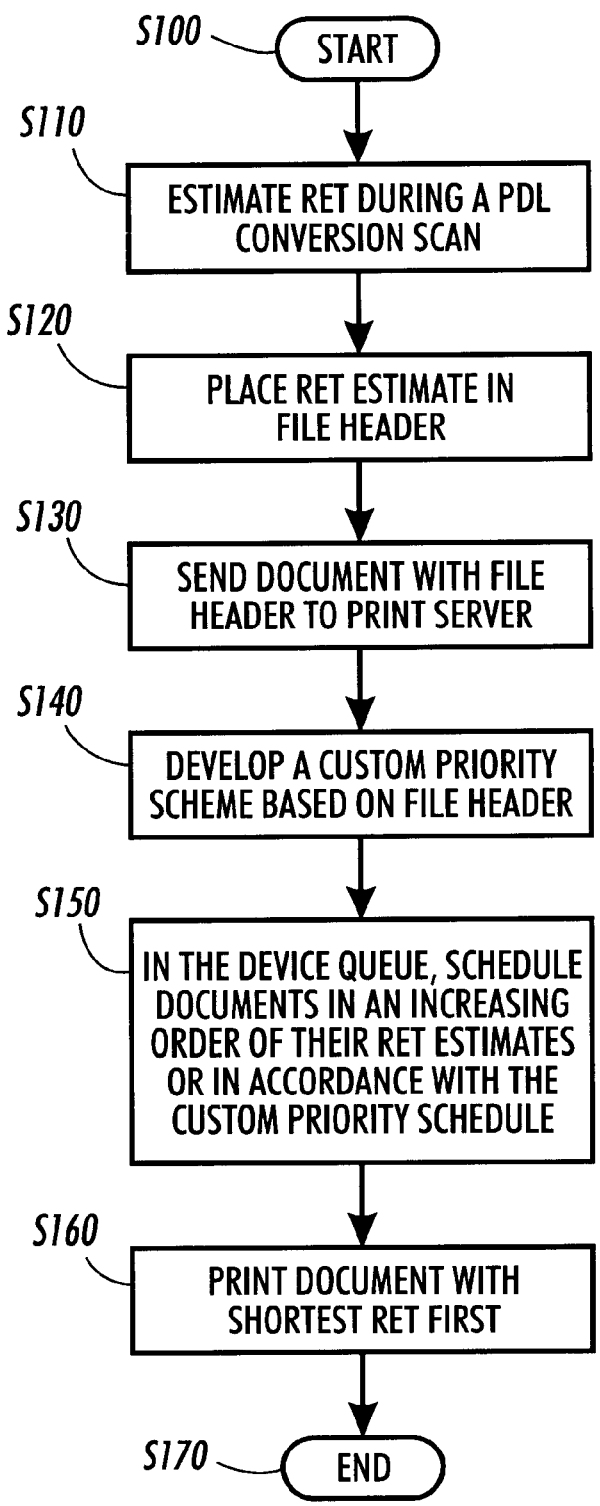
FIG. 4 shows a flowchart outlining one exemplary embodiment of a method for scheduling documents in a networked printer environment in accordance with the systems and methods of the invention.

FIG. 4 shows a flowchart outlining one exemplary embodiment of the method for scheduling documents in a networked printer environment in accordance with the systems and methods of the invention. As shown in FIG. 4, the process begins in step S100, and continues to step S110, where the system, during a PDL conversion scan, estimates the rasterization execution time (RET) for the document. Next in step S120, the system places the RET estimate in a file header. Then, in step S130, the system sends the PDL converted document with the file header to a print scheduler, such as a print server. Control then continues to step S140.

In step S140, the system develops a custom priority scheme based on the file header. The custom priority scheme allows a user to override any RET generated priority. For example, if a user has an important color print job with a long RET, the custom priority scheme will allow this particular print job to be advanced before other prints jobs, regardless of their RET. The custom priority scheme will look at the RET estimates and any override flags that may be set and schedule jobs accordingly. Then in step S150, the system schedules the documents for printing in an increasing order of their RET estimates. Simple jobs will normally go first and complex jobs thereafter, unless a priority override is in place.

In step S160, if no priority override flag is in place, the system prints documents with the shortest RET first. Control then goes to step S170, where the control process ends.

As shown in FIGS. 1 and 3, the document RET scheduling system is preferably implemented either on a single program general purpose computer or separate program general purpose computer. However, the document RET scheduling system can also be implemented on a special purpose computer, a programmed microprocessor or microcontroller and peripheral integrated circuit element, an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowchart in FIG. 4 can be used to implement the document RET scheduling system.

The disclosed method may be readily implemented in software using object or object-oriented software development environments that provide portable source code that can be used on a variety of computer or workstation hardware platforms. Alternatively, the disclosed document RET scheduling system may be implemented partially or fully in a hardware using standard logic circuits or VLSI design. Whether software or hardware is used to implement the systems in accordance with this invention is dependent on the speed and/or efficiency requirements of the system, the particular function, and the particular software or hardware systems or microprocessors or microcomputer systems being utilized. The document RET scheduling system and methods described above, however, can be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as Java® or CGI script, as a resource residing on a server or graphics work station, as a routine embedded in a dedicated print management system, web browser, web TV interface, PDA interface, or the like. The document RET scheduling system can also be implemented by physically incorporating the system and method into a software and/or hardware system, such as the hardware and software of a graphics workstation or dedicated print management system.

What is claimed is:

1. A method for scheduling print jobs for a printer, the method comprising:
   estimating a document rasterization execution time (RET) during a PDL conversion scan;
   determining a file header based on the estimated rasterization execution time;
   associating the file header with the document;
   transmitting the document along with the file header to a print job scheduler; and
   scheduling the documents for printing based on their rasterization execution time estimates.

2. The method of claim 1, wherein the RET estimation is effected by a workstation print driver.

3. The method of claim 1, further comprising:
   determining the complexity level of the document; and
   encoding the complexity level as a rating in the file header.

4. The method of claim 3, wherein the determining the complexity level step includes evaluating whether there is at least one of color graphics, font changes, or style differences within the document.

5. The method of claim 4, wherein the rating determines a priority level for the print job.

6. The method of claim 1, further comprising:
   detecting whether there is a priority override for a print job, wherein the priority override gives the print job a highest print priority; and
   printing the print job with the highest print priority first regardless of rasterization execution time.

7. The method of claim 1, further comprising printing the document with the shortest rasterization execution time first.

8. The method of claim 7, wherein the printing is done on a color printer.

9. A device for scheduling print jobs in a printer, the device comprising:
   a print driver, the print driver estimates a document rasterization execution time during a PDL conversion scan, determines a file header based on the estimated rasterization execution time, associates the file header with the document, and transmits the document along with the file header to a print job scheduler, wherein the print job scheduler schedules the document for printing based on the document rasterization execution time estimates.

10. The device of claim 9, wherein the print driver component estimates the rasterization execution time during the PDL conversion scan at the workstation before sending the document to a network print server or a printer.

11. The device of claim 9, further comprising the print driver component determines the complexity level of the document, and encodes the complexity level as a rating in the file header.

12. The device of claim 11, wherein the print driver component determines the complexity level by evaluating whether there is at least one of color graphics, font changes, or style differences within the document.

13. The device of claim 12, wherein the print driver rating determines a priority level for the print job.

14. The device of claim 9, further comprising:
    a print server detects whether there is a priority override for a print job, wherein the priority override gives the print job a highest print priority and a printer prints the print job with the highest print priority first regardless of rasterization execution time.

15. The device of claim 9, wherein a printer prints the document with the shortest rasterization execution time first.

16. The device of claim 15, wherein the printer is a color printer.

17. A storage medium comprising information for scheduling print jobs for a printer, comprising:
    information that estimates a document rasterization execution time during a PDL conversion scan;
    information that determines a file header based on the estimated rasterization execution time;
    information that associates the file header with the document;
    information that transmits the document along with the file header to a print job scheduler; and
    information that schedules the documents for printing based on their rasterization execution time estimates.

18. The storage medium of claim 17, wherein the information that estimates the rasterization execution time is affected by a workstation print driver.

19. The storage medium of claim 17, further comprising:

information that determines the complexity level of the document; and information that encodes the complexity level as a rating in the file header.

20. The storage medium of claim 19, wherein the information that determines the complexity level step includes information that evaluates whether there is at least one of color graphics, font changes, or style differences within the document.

21. The storage medium of claim 20, wherein the rating information determines a priority level for the print job.

22. The storage medium of claim 17, further comprising:

information that detects whether there is a priority override for a print job, wherein the priority override gives the print job a highest print priority; and information that prints the print job with the highest print priority first regardless of rasterization execution time.

23. The storage medium of claim 17, further comprising information that prints the document with the shortest rasterization execution time first.

24. The storage medium of claim 23, wherein the information that prints is associated with a color printer.

* * * * *